United States Patent Office 3,510,406
Patented May 5, 1970

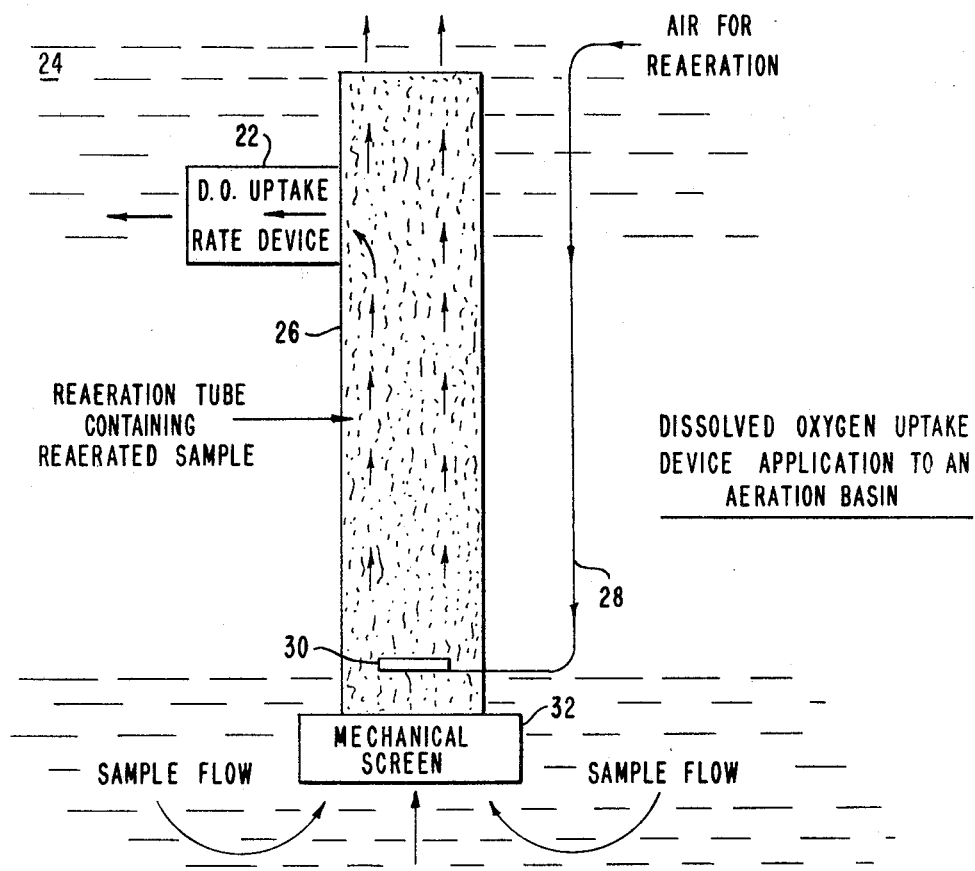
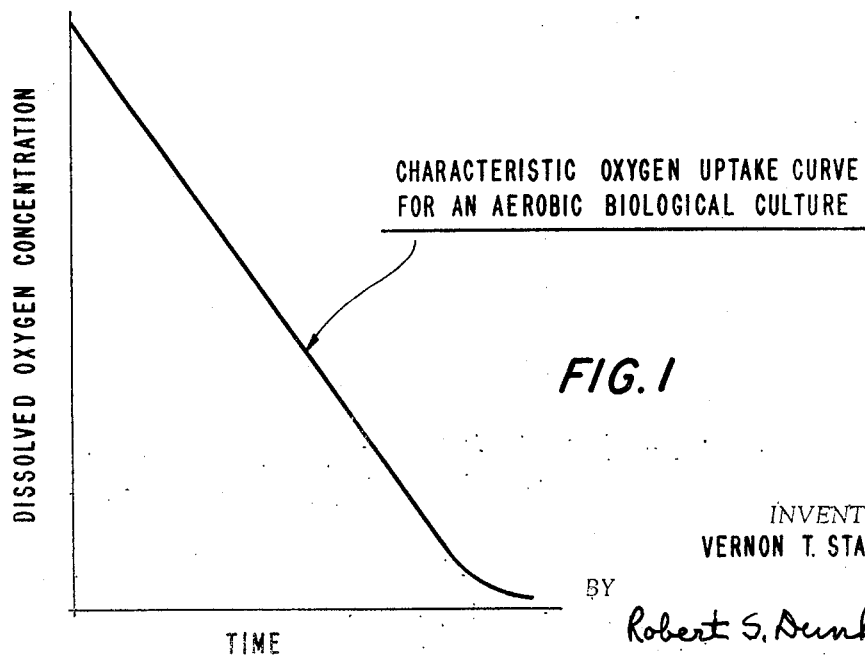

3,510,406
METHOD AND APPARATUS FOR MEASURING RATE OF CONSUMPTION OF DISSOLVED GAS IN A LIQUID
Vernon T. Stack, Jr., Chadds Ford, Pa., assignor to Pennwalt Corporation, a corporation of Pennsylvania
Filed Nov. 17, 1964, Ser. No. 411,755
Int. Cl. G01n 27/54, 27/46
U.S. Cl. 204—1          12 Claims

ABSTRACT OF THE DISCLOSURE

The rate of consumption of dissolved oxygen in biological oxidation systems is determined herein by detecting the concentration of dissolved oxygen in a sample at a first time, permitting the biological oxidation processes to proceed alone without permitting access of additional oxygen to the sample, and detecting the concentration of dissolved oxygen in a sample at a later time when oxygen consumption has proceeded substantially but has not reached complete oxygen consumption. The rate may be determined by successively passing samples from a first position to a second position, at a fixed rate, dissolved oxygen probes being located at the two positions. Signals from the probes are compared to provide an indication of rate of oxygen consumption. The signal from the first probe may be stored and then reproduced at a later time corresponding to the transit time of samples passing from the first probe to the second probe.

A positive displacement pump may also be employed to serve as a means for forcing samples of the liquid from the first probe to the second probe. The pump involves first and second screws of deformable resilient material, the screw faces of which engage each other in an interference fit.

---

This invention relates to oxidation analyzers and, more particularly, to methods and apparatus for determining the rate of consumption of dissolved oxygen in biological oxidation systems.

The consumption of dissolved oxygen in a biological oxidation system such as an aerobic culture of microorganisms is an important indication of the biochemical reactions involved. The knowledge of the rate and quantity of oxygen consumption in such processes can aid greatly in the understanding and interpretation of the reactions taking place. For example, in a continuously-fed biological oxidation process used for the treatment of industrial waste or domestic sewage, the rate of consumption of dissolved oxygen at any given time is directly related to the oxygen requirements of the process at that time. The rate of consumption also provides information about the progress of the oxidation reactions taking place and serves as an indication of the status of the process at the time the rate is determined.

In the past, the measurement of oxygen consumption has generally been limited to the laboratory where direct measurements are made using respiration devices. A disadvantage of such respiration devices is that they provide oxygen consumption data only for a small captive sample contained within the respirometer. Measurements cannot be made of the rate of oxygen consumption in systems outside the respirometer, and hence the respirometers are not suitable for the continuous monitoring of oxidation processes.

Accordingly, it is an object of the present invention to provide a device and a technique for measuring the rate of consumption of dissolved oxygen, suitable for the continuous monitoring of such rate.

It is also an object of the invention to provide a device suitable for determining the rate of consumption of dissolved oxygen which is immersible in a stream or other body of liquid whose rate of oxygen consumption is to be determined.

It is an object of the present invention to provide a method for determining the rate of consumption of dissolved oxygen in an aqueous medium subject to biological oxygen processes.

These objects are achieved in the present invention by providing a housing which includes a pair of probes, each of which detects the concentration of dissolved oxygen of liquid presented thereto. The probes are separated in the housing by a sealed fluid path, and are positioned adjacent an inlet and an outlet of the housing. The housing is immersed in a liquid environment to be monitored, and means are provided within the housing to cause liquid from the environment to pass continuously through the sealed path in the housing from the inlet to the outlet. Signals generated by the probes are then compared to determine the rate of dissolved oxygen consumption in the liquid passing through the housing.

Specifically, the fluid passing through the sealed path in the housing consumes oxygen at a certain rate, and, since oxygen is not replenished because of the sealing of the path, the concentration of dissolved oxygen is higher at the inlet than at the outlet for any particular quantity of fluid. If the concentration of dissolved oxygen of liquid passing through the inlet is constant or changes very slowly with time, so that the dissolved oxygen concentration at the inlet is essentially constant during time for sample passage through the sealed path, the signals from the inlet and outlet probes may be compared directly and continuously to provide a continuous indication of the consumption of dissolved oxygen of a liquid passing through the housing. On the other hand, if the dissolved oxygen concentration at the inlet changes appreciably during the time taken for a quantity of liquid to pass through the housing, then the probe signals cannot be directly compared, inasmuch as simultaneous signals from both probes represent oxygen concentration measurements of different samples of liquid. Hence means are provided for storing the signal from the probe positioned at the inlet of the housing.

In particular, the signal from the probe positioned at the inlet of the housing is stored and then reproduced at a time $\Delta t$ later corresponding to the transit time of liquid passing through the housing. The reproduced signal is then compared with the signal from the probe at the housing outlet to generate a difference signal representative of the consumption of dissolved oxygen in the same and not different samples of liquid. Means are provided which permit the continuous storage and reproduction of the inlet probe signal so that a continuous output signal is generated representative of the oxygen uptake rate of liquid continuously passing through the housing.

By making constant the time of transit of liquid passing through the housing, the difference between the dissolved oxygen concentration at the inlet and at the outlet of the housing is representative of the rate of consumption of dissolved oxygen.

The present invention contemplates a positive displacement pump positioned within the housing to serve as a means for forcing liquid through the housing with a predetermined constant transit time. The pumping action is such that discrete packets of fluid are pumped through the housing. By this action, quantities of liquid are separated from each other and are allowed to consume oxygen effectively independently of each other. This operation is extremely helpful, especially in situations where the liquid monitored is consuming oxygen at changing rates.

Advantageously the positive displacement pump is formed from two screws having intermeshing threads whose opposing faces engage each other in at least a substantial portion of the region of intermeshing of the threads. The screws are enclosed by a sleeve which engages the crests of the threads outside the region of intermeshing. A fluid inlet and a fluid outlet to the screw pump are provided at the ends of the intermeshing screws, and the screws are rotated to provide a pumping of fluid from the inlet to the outlet. The meshing together of the screws and the contact between opposing faces of the threads isolates one packet of fluid from another.

The invention further includes a flow switching valve included in the housing which is adapted to force liquid from the environment in which the housing is immersed inwardly into the housing through both the inlet and the outlet. The probes positioned adjacent the inlet and the outlet then receive liquid having the same concentrations of dissolved oxygen. The signals from the probes may be compared, and the probes may be calibrated so that the signals are rendered equal.

Further provision is made to provide for the agitation of the liquid passing through the housing adjacent the probes so as to ensure the proper determination of dissolved oxygen concentrations. This may be provided by stirrers, for example, which may additionally contain soft bristles which brush against the probes to clean the probe surfaces.

The above objects and features of the present invention will be more completely understood by reference to the following detailed description, which includes the accompanying drawings. In the drawings:

FIG. 1 is a characteristic curve for an aerobic biological culture showing the concentration of dissolved oxygen in the culture versus time under conditions where oxygen is not replenished;

FIG. 2 shows a system in accordance with the invention for monitoring the rate of consumption of dissolved oxygen in a body of liquid;

Figure 23:
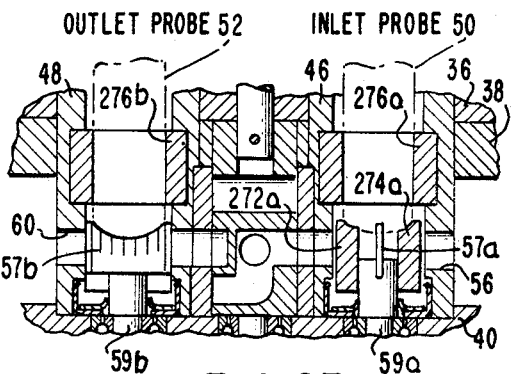
Figure 21:
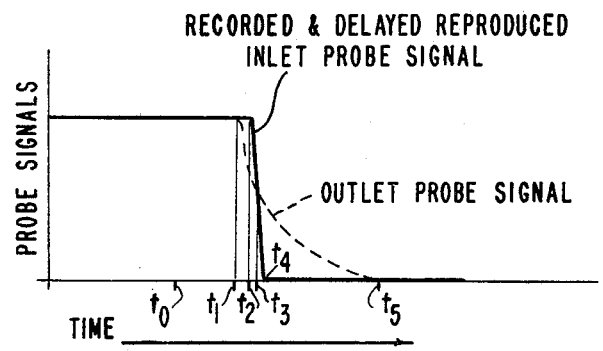
Figure 13:
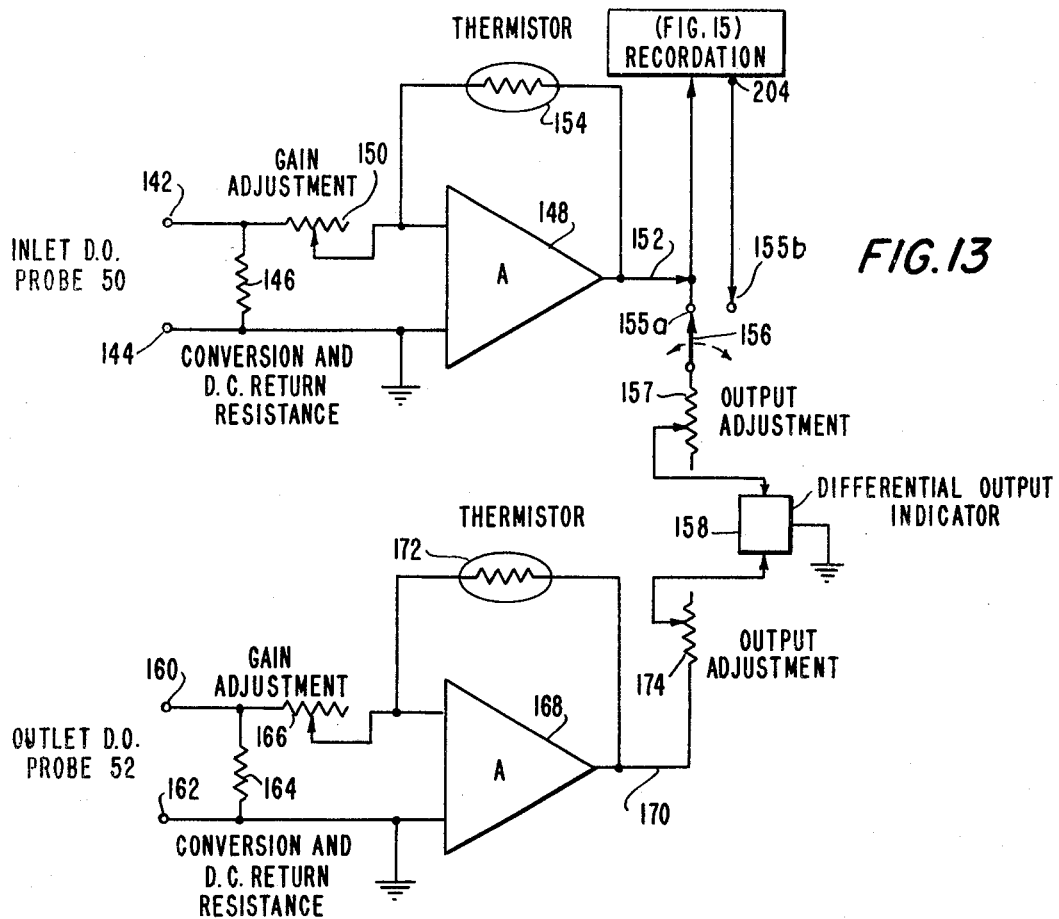
FIG. 13 is a block diagram of an electrical circuit in accordance with the invention for carrying out part of the process indicated by the flow diagram of FIG. 12.
Figure 20:
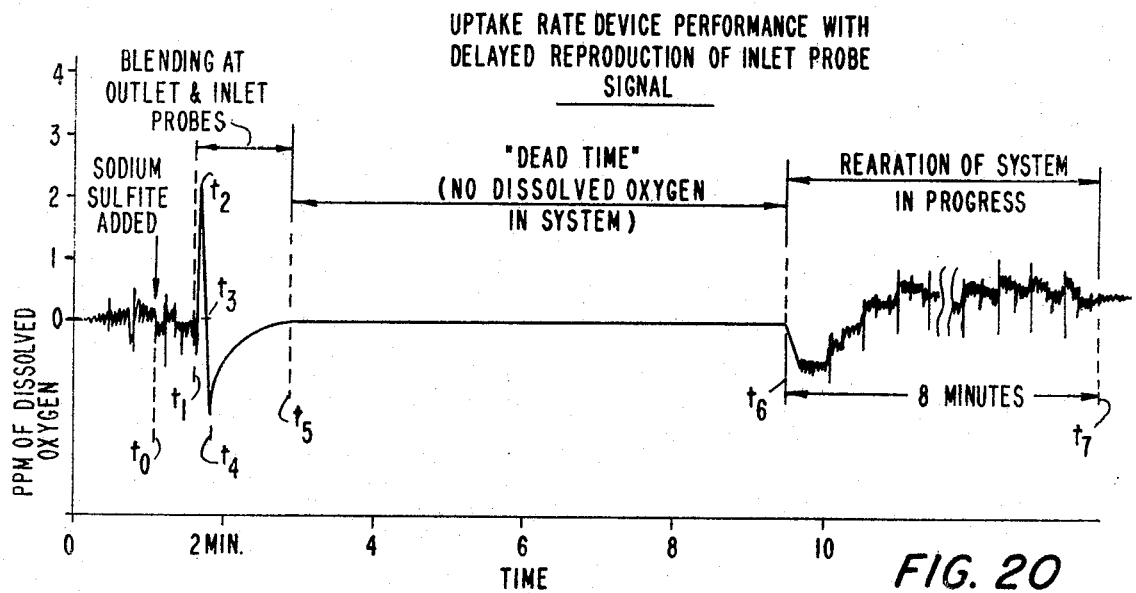
FIG. 20 is a curve which plots experimental data developed through the use of a device as shown in FIGS. 3–6A and circuitry in accordance with FIGS. 13 and 15, involving a comparison of the signal from an outlet probe of the device with the recorded and delayed reproduced signal from an inlet probe of the device.
Figure 22:
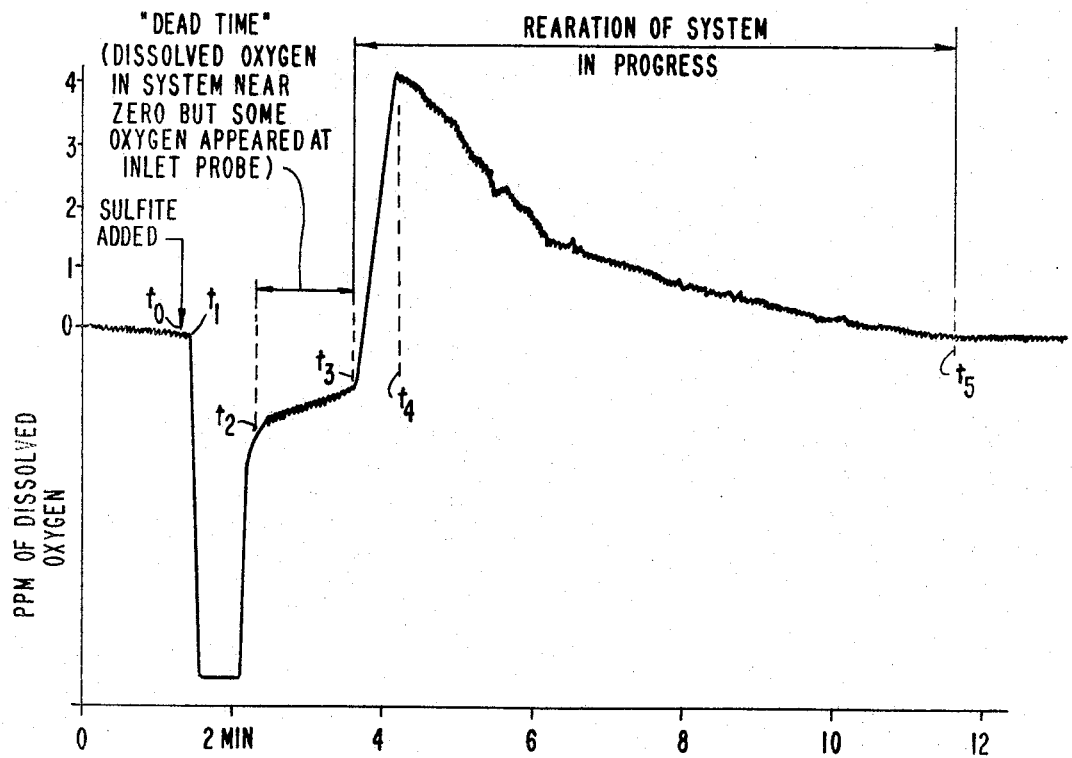

FIG. 21 gives curves showing signals generated by the system used to develop the data of FIG. 20 useful in interpreting the data of FIG. 20;

FIG. 22 is a curve which plots experimental data developed through the use of a device as shown in FIGS. 3–6A and circuitry in accordance with FIG. 13, involving a direct comparison of signals from inlet and outlet probes of the device; and FIG. 23 is a view of a portion of a device as shown in FIGS. 3–6A, modified so as to reduce the effects of liquid blending.

Referring now to the figures, FIG. 1 is helpful in understanding the invention. The curve shown in this figure represents the concentration of dissolved oxygen in an aerobic biological culture versus time. The concentration decreases linearly with time as the culture consumes oxygen. For relatively low oxygen concentrations, however, generally on the order of 0.5 p.p.m. (parts per million) or less, the curve is nonlinear. At such low concentrations of dissolved oxygen, approaching complete consumption of oxygen sufficient oxygen is not present for the normal oxidation processes to take place, and oxygen tension may control the uptake rate. That is, at such low concentrations of dissolved oxygen, diffusion of oxygen into the culture rather than consumption of oxygen by the culture is the controlling factor.

The slope of the linear portions of the curve shown in FIG. 1 thus is representative of the rate of consumption of dissolved oxygen, typically termed the oxygen uptake rate. In order for the rate to be properly determined, it is necessary that sufficient oxygen be dissolved within the culture to ensure that, during a test, the process takes place along the linear portion of the curve, namely, that the concentration of dissolved oxygen is substantially greater than 0.5 p.p.m. during the entire test.

FIG. 2 shows a device 22 for determining the dissolved oxygen uptake rate, which is positioned within a body of liquid 24 whose uptake rate is to be determined. The uptake rate device 22 is shown attached to a reaeration tube 26 which is supplied with air for reaeration from a supply line 28 coupled to a discharge nozzle 30 contained within the tube. Liquid flows into the reaeration tube 26 through a screen 32 which is incorporated, if desired, to screen relatively large particles from the liquid.

Within the tube 26, the liquid is reaerated so that its dissolved oxygen concentration is sufficiently high as to render the oxygen uptake of the liquid in the testing device 22 along the linear portion of the curve of FIG. 1. As the liquid flows through the uptake rate device 22, oxygen is consumed therein, which is not replenished, and the rate of consumption of dissolved oxygen is determined. This determination is continuous, and may be used for monitoring any aerobic biological process, such as the treatment of sewage, to determine if the process is proceeding properly.

FIGS. 3–6 show the details of a device suitable for forming a portion of the dissolved oxygen uptake rate device 22 of FIG. 2. Referring to these figures together, the device includes a housing 34 formed with two abutting upper plates 36 and 38 spaced from three abutting lower plates 40, 42 and 44. The housing incorporates a pair of probe-supporting tubes 46 and 48 which extend through the plates 36 and 38 and into the plate 40. The tube 46 contains an inlet probe 50, while the tube 48 contains an outlet probe 52.

The probes 50 and 52 are typically polarographic cells which yield electrical signals representative of the concentration of dissolved oxygen in a liquid presented thereto. Such cells may each be the same as the cell disclosed in Pat. No. 2,913,386 issued on Nov. 17, 1959 to L. C. Clark, Jr. Various suitable forms of electrically-responsive oxygen probes may be used, it being understood that a common type of such device embodies a cell having electrodes, usually of noble metals, so circumstanced and so associated with the liquid under test, either directly or through another electrolyte and a membrane, as to afford variation of the internal cell resistance with variation of dissolved oxygen content in the liquid, for instance by the effect of oxygen in reducing polarization of one electrode As is well known in the art of cells of this type and of circuits for them, the resultant signal may be read as a voltage or current which is governed by the detected oxygen concentration.

Figure 5:
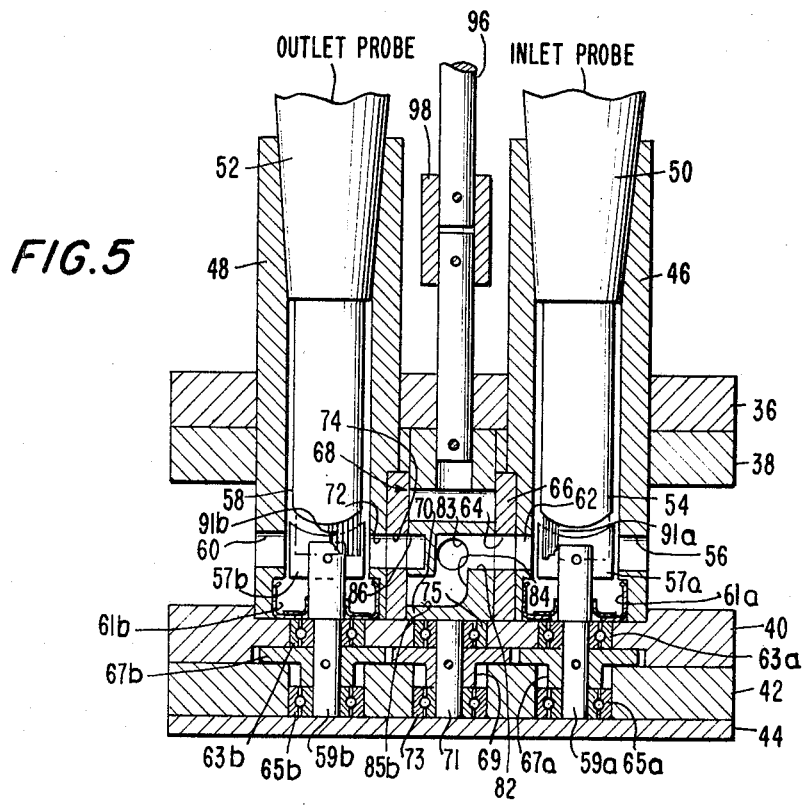

As shown in FIG. 5, the inlet probe 50 includes a bottom portion 54 positioned adjacent an inlet 56 formed in the support tube 46. Similarly, bottom portion 58 of the outlet probe 52 is positioned adjacent an outlet 60 formed in the support tube 48. Stirrers 57a and 57b in the form of blades (FIGS. 9 and 10) respectively positioned adjacent the inlet 56 and outlet 60 are adapted to be rotated to force liquid at the inlet and outlet against the inlet and outlet probes. The stirrers are driven in the same fashion, and hence only the driving arrangement for the stirrer 57a will be described in detail. Components for this driving arangement are designated by numerals with the suffix a; corresponding components for the driving arrangement for the stirrer 57b are designated by the same reference numerals with the suffix b.

In FIG. 5, the stirrer 57a is connected to a shaft 59a which passes through a seal 61a in the support tube 46. The shaft 59a is journaled for rotation in bearings 63a and 65a and includes a spur gear 67a mounted thereon. The spur gear 67a meshes with a spur gear 69 mounted on a shaft 71 journaled for rotation in bearings 73 and 75. The spur gear 69 meshes with a spur gear 77 shown in FIGS. 6 and 6A mounted on a shaft 79 which is journaled for rotation in bearings 79a and 79b respectively contained in plates 38 and 42. A seal 79c in included in the plate 36 through which the shaft 79 passes; a further seal is formed from sleeve 89.

The shaft 79 is adapted to be rotated by a suitable motor (not shown) to rotate the stirrers 57a and 57b through the drives formed from spur gears 77, 69 and 67a and 67b. As shown in FIG. 5, the stirrers may include flexible bristles 91a and 91b which brush across the bottom portions 54 and 58, respectively, of the inlet and outlet probes to clean the probes and to ensure good contact with each of the probes of the liquid whose dissolved oxygen concentration is determined.

As shown in FIG. 5, the inlet probe support tube 46 contains an exit passage 62 which is aligned with a corresponding passage 64 in a stationary cylindrical sleeve 66 forming a portion of a flow controlling valve 68. The other portion of the valve is formed from a rotatable rod-shaped member 70. The outlet probe support tube 48 is similarly formed with an entrance passage 72 aligned with a corresponding passage 74 in the cylindrical valve sleeve 66. The rod-shaped member 70 of the flow controlling valve 68 is adapted to channel fluid to a positive displacement pump 76 shown in FIG. 4 as formed from meshing screws 78 and 80.

Figure 6:
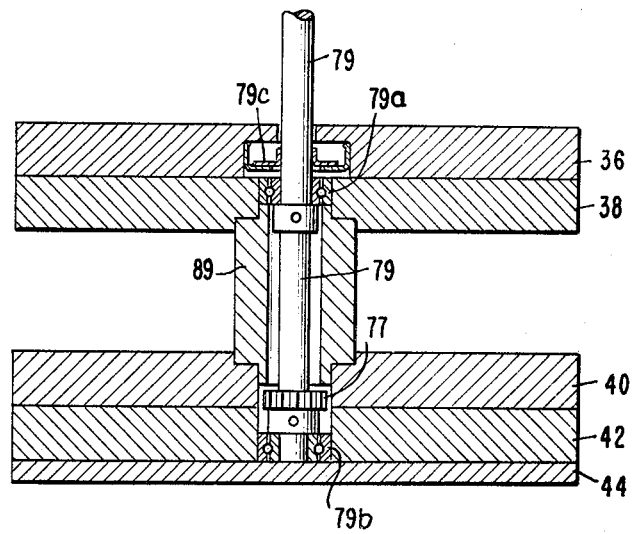
Figure 6A:
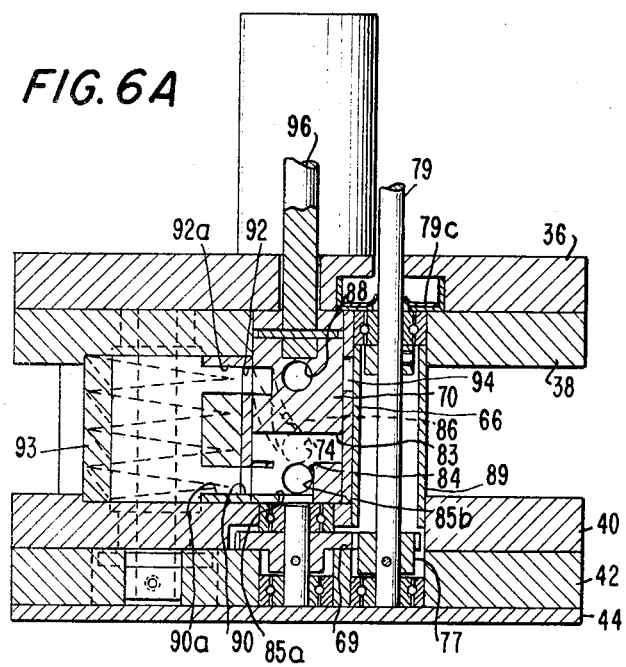
Figure 7:
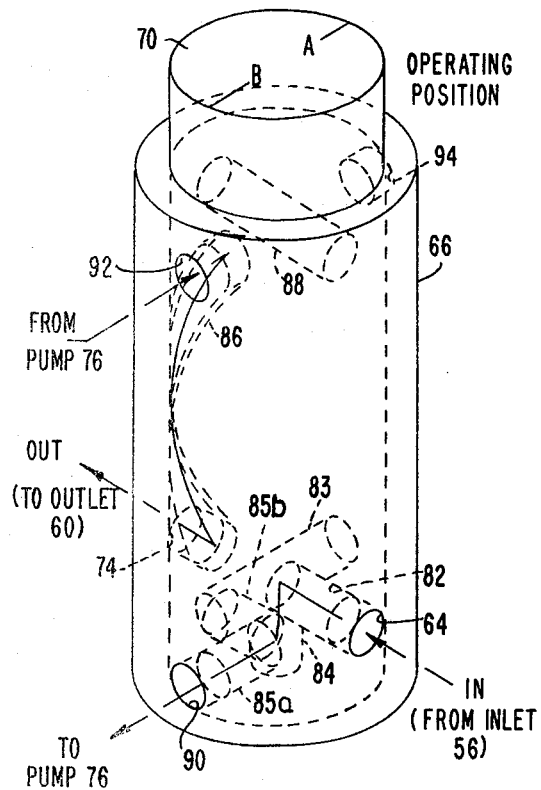
FIGS. 7 and 8 are simplified perspective views of a flow switching valve in accordance with the invention and used in the device shown in FIG. 3, showing the valve in its two different operating positions.
Figure 8:
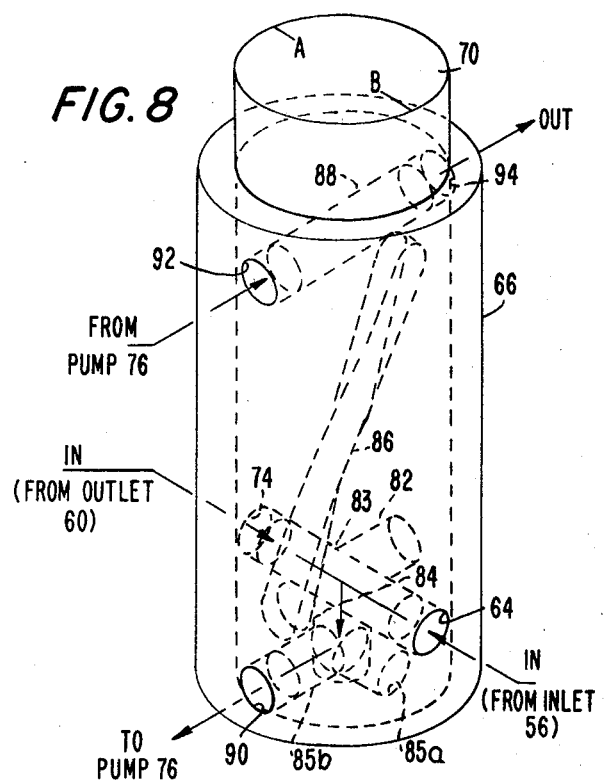
Figure 9:
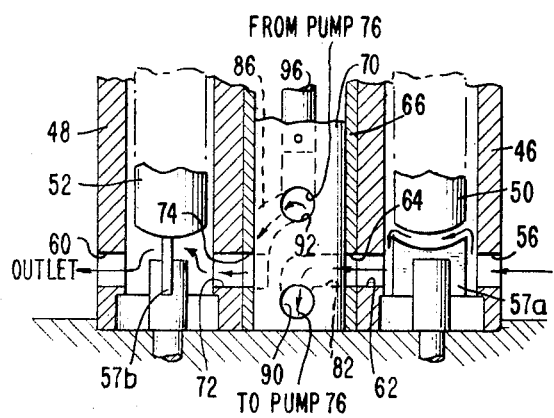
FIGS. 9 and 10 are partial sectional views of the device shown in FIG. 3, illustrating the flow switching valve in its two different operating positions and corresponding respectively to FIGS. 7 and 8.
Figure 10:
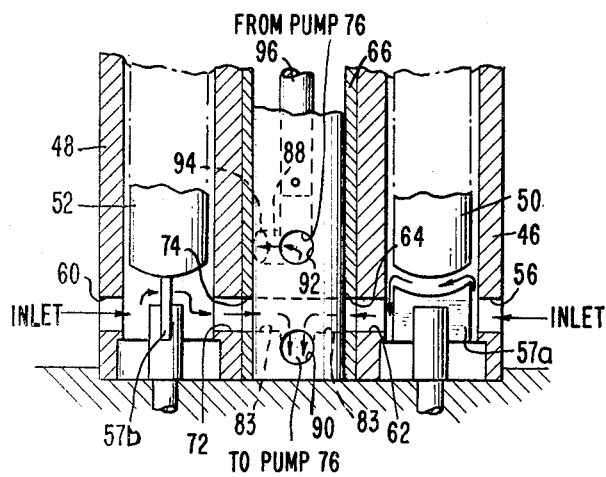

The action of the flow switching valve 68 is best illustrated in FIGS. 7 and 8, which are to be consulted in connection with FIGS. 9 and 10, respectively. FIG. 7 is a simplified perspective view of the valve 68 (shown also in FIG. 9) illustrating how the valve operates to draw liquid in from the inlet 56, to supply that liquid to the pump 76, to receive the liquid from the pump and to apply the liquid to the outlet 60. To this end, the inner rod-shaped valve member 70 is formed with passages 82, 83, 84, 85a, 85b, 86 and 88. The passages 82, 83, 84, 85a and 85b are interconnected. In the position of the valve shown in FIGS. 7 and 9, the passage 82 is aligned with the passage 64 in the surrounding cylindrical valve sleeve 66. Fluid flows through the passage 64 from the inlet 56 (FIG. 9), downwardly through the passage 84 and thence through the passage 85a to exit through the cylindrical valve sleeve 66 via a passage 90 therein. The passage 90 is coupled to the positive displacement pump 76 as shown in FIG. 6A. Specifically, the passage 90 is aligned with a corresponding passage 90a in enclosure 93 which surrounds the pump. Fluid is pumped upwardly through the pump to exit from the top portion thereof through passage 92a in enclosure 93 which is aligned with passage 92 in the valve sleeve 66, as shown in FIG. 6A. The passage 92 adjoints the upper end of passage 86 in the valve member 70; the lower end of the passage 86 is aligned with the passage 74 in the valve sleeve 66, which is coupled to the outlet 60 as shown in FIG. 9.

FIGS. 8 and 10 show the alternative position of the flow switching valve 68 wherein the fluid is caused to pass inwardly through both the inlet 56 and outlet 60 and into the pump 76. In this case, the valve member 70 is rotated 90° counterclockwise from the position shown in FIG. 7. The valve member has been designated in FIGS. 7 and 8 with symbols A and B on the top face thereof to show the different orientations of the valve member in the two figures. In the position of the valve shown in FIGS. 8 and 10, the passages 64 and 74 in the cylindrical valve sleeve 66 are both aligned with the passage 83 in the valve member 70. Hence liquid flows in from both the inlet 56 and the outlet 60, as shown in FIG. 10, through the passage 83, downwardly through the passage 84 (FIG. 8) and thence through the passage 85b to the passage 90 in the valve sleeve 66 which leads to the inlet 90a of the pump 76 (FIG. 6A). From the pump 76 the liquid flows through the outlet 92a and the passage 92 in the valve sleeve 66 and straight through the passage 88 in the valve member 70, which is now aligned therewith as shown in FIG. 8, and thence through a passage 94 in the valve sleeve 66 and out of the housing 34 and into the liquid environment in which the housing is immersed.

Figure 3:
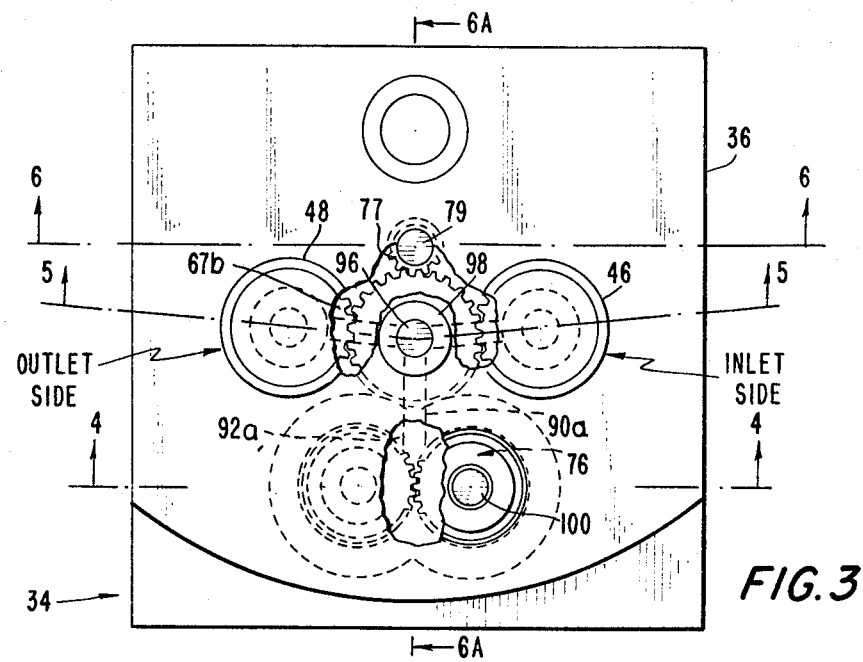
FIG. 3 is a partially cut away plan view of a device in accordance with the invention useful in determining the rate of consumption of dissolved oxygen in a liquid.
Figure 4:
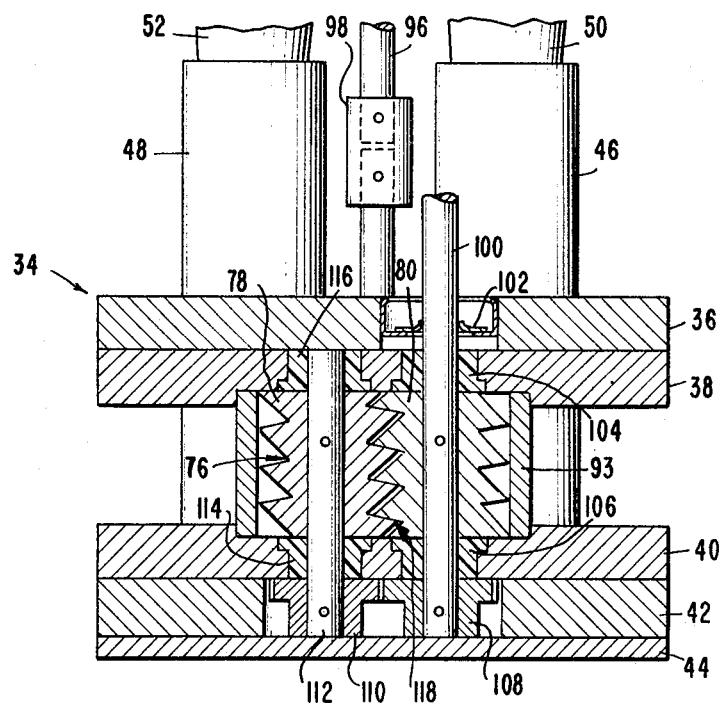
FIGS. 4, 5, 6 and 6A are sectional views of the device shown in FIG. 3, taken generally along the section lines 4—4, 5—5, 6—6 and 6A—6A of FIG. 3 and looking in the direction of the arrows.

The valve 68 is adapted to assume these two positions of flow for the purpose of calibration and test, as will be explained later. The valve member 70, which is rotated 90° to change valve settings, is actuated by means of a control rod 96 which is manually twisted to change the valve setting. The shaft 96 may include a shaft connector 98 in the case of a split shaft 96 as shown in FIGS. 4 and 5.

As explained above, liquid flows from the valves 68 to the positive displacement pump 76. As shown in FIG. 4, the positive displacement pump advantageously may be formed from two screws 78 and 80 positioned within a sealed enclosure 93. The inside walls of the enclosure 93 conform closely to the periphery of the screws, except where the screws intermesh. The screws are rotated by a drive shaft 100 which is driven by any suitable motor (not shown). The shaft 100 passes through a seal 102 and revolves in bearings 104 and 106. A spur gear 108 is connected to the lower end of the pump drive shaft 100 and meshes with a similar spur gear 110 connected to the lower portion of shaft 112 which drives the screw 78. The shaft 112 is journaled for rotation in bearings 114 and 116.

Figure 11:
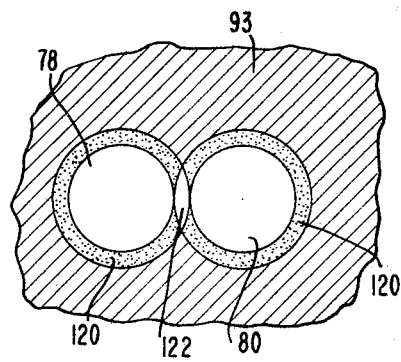
FIG. 11 shows the action of a screw-type positive displacement pump in accordance with the invention used to pump liquid through the device of FIG. 3.

As the pump drive shaft 100 is rotated, causing the intermeshing screws 78 and 80 to rotate, liquid is driven upwardly by the screws in a series of discrete packets of liquid. FIG. 11 shows the action of the screw pump. Referring to FIG. 11, each packet of fluid takes the shape of a half of a general figure 8, as shown at 120 in the figure. Faces of the thread of each screw are in contact in the zone designated at 122 because of the meshing together of the threads of the screws 78 and 80 shown in FIG. 4. The meshing together of the screws and the contact of thread faces thus isolates one packet of fluid from another, so that a continuous fluid path cannot be traced from the top of the screws 78 and 80 to the bottom. The formation of discrete packets of fluid is desirable inasmuch as each packet may be considered to be a "sample" of liquid isolated from any other sample.

Figure 16:
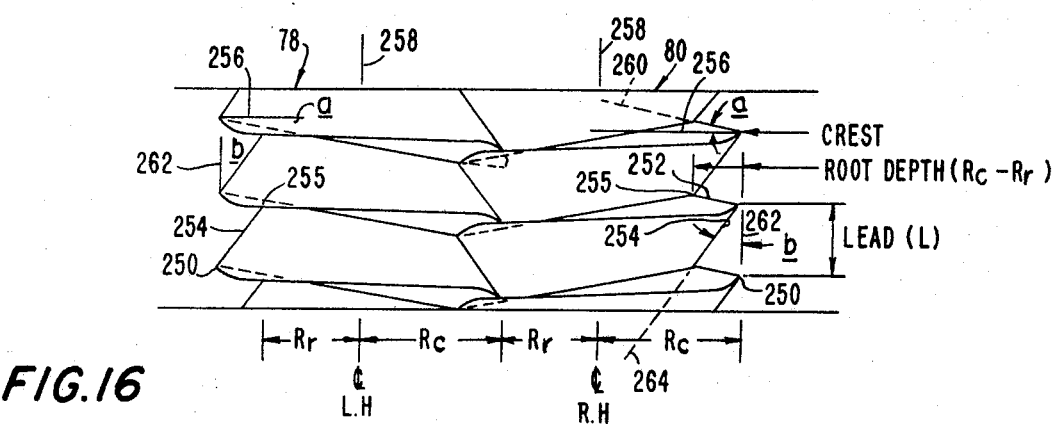
FIG. 16 is a side view of two intermeshing screws which form a screw-type positive displacement pump as shown in FIG. 4 and whose action is depicted in FIG. 11.

FIGS. 16–19 are helpful in understanding the operation of the screw pump. In FIG. 16, the screw 78 is formed with a left-hand thread, while the screw 80 is formed with a right-hand thread. Each screw thread comprises a helical crest 250 and faces 252 and 254 joined at the crest. The root of each screw is designated 255. Each screw has a crest radius designated $R_c$ in the figure; the root radius is designated $R_r$. Hence the root depth or depth of cut is equal to $R_c-R_r$. The angle of the face 252 is designated as $a$, while the angle of face 254 is designated as $b$. Specifically, $a$ is the angle between a plane 256 perpendicular to central axis 258 of the screw and a line 260 passing from the central axis 258 through points along face 252 to crest 250; $b$ is the angle between a line 262 parallel to the central axis 258 and another line 264 along the face 254, the lines 262 and 264 as well as the central axis 258 being contained in a single plane.

Figure 17:
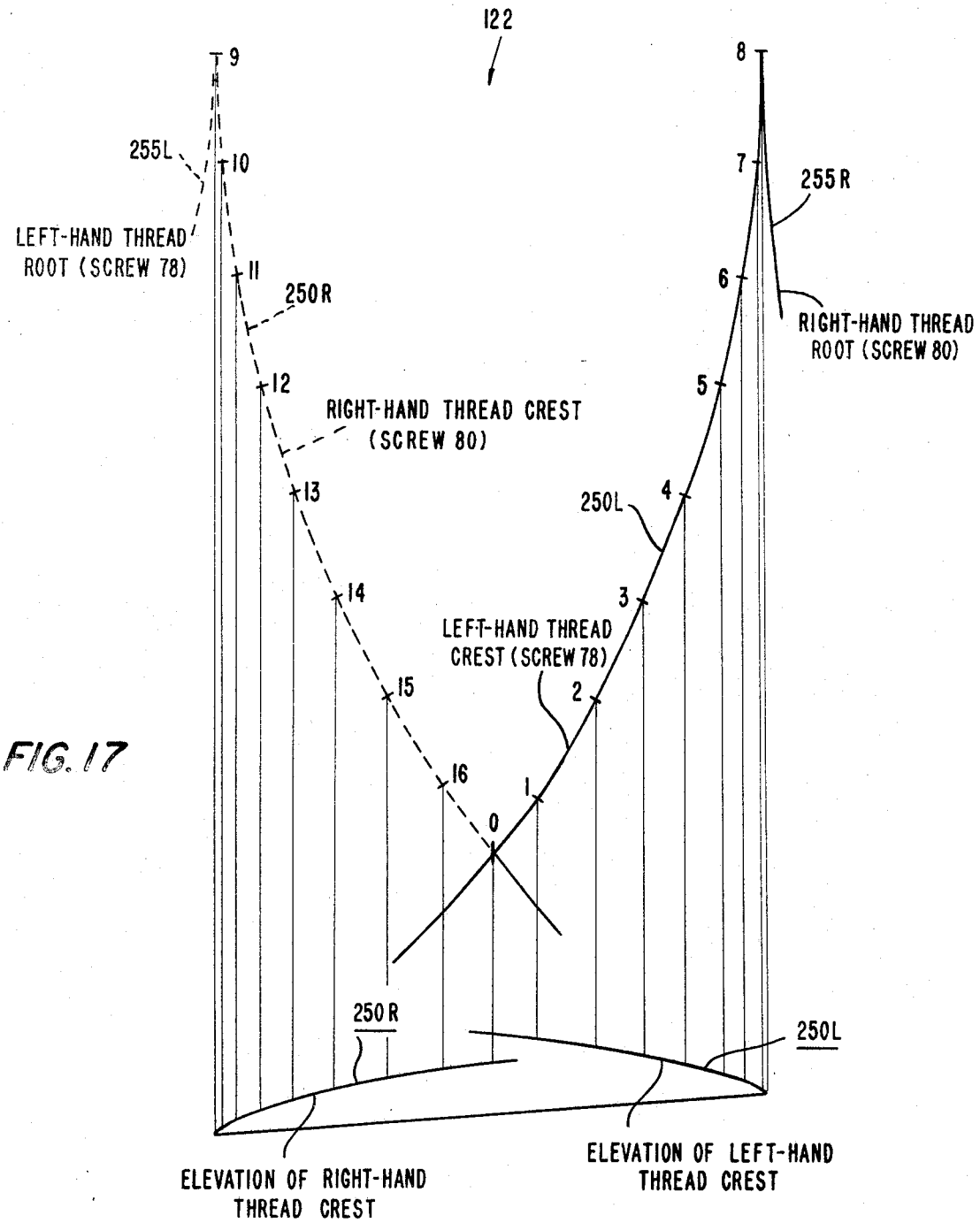
FIG. 17 shows an enlarged plan view and an enlarged elevational view of portions of the screws shown in FIG. 16, and is useful in illustrating the manner in which opposing thread faces engage each other.

The manner in which opposing faces 252 of the screws 78 and 80 engage each other to provide the unique pumping of fluid in discrete packets is explained with reference to FIG. 17, which shows an enlarged plan view and an enlarged elevational view of portions of the screws 78 and 80 in the region of intermeshing 122. Curve 250L is a plan view of a portion of the left-hand thread crest 250 of the screw 78, while curve 250R is a plan view of a portion of the right-hand thread crest 250 of the screw 80. Curves 255L and 255R are plan views of portions of the roots 255 of the screws 78 and 80, respectively. The curves 250L and 250R are divided into zones 0–8, 9–16 and 0, respectively. The elevations of the thread crests are shown in the lower portion of FIG. 17 and are designated 250L and 250R.

Figure 18:
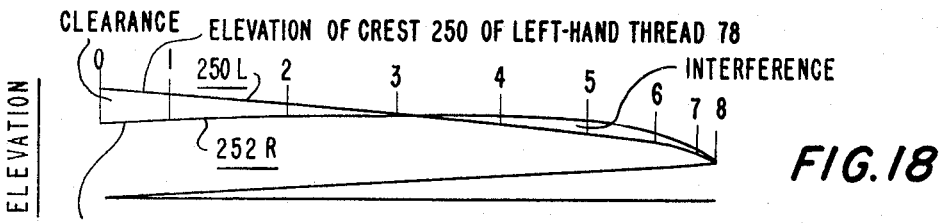
FIG. 18 shows enlarged elevational views of the thread crest of one of the screws in FIG. 16 and the surface of the opposing face of the other screw thread, illustrating the manner in which opposing thread faces engage each other.

As pointed out above, it is necessary that opposing faces 252 of the screws 78 and 80 engage each other in the region of intermeshing 122 to ensure that discrete packets of fluid are pumped. FIG. 18 shows the elevations, for example, of a portion of the left-hand thread crest 250 of the screw 78 (curve 250L) and the surface of face 252 of the thread of screw 80 (curve 252R) vertically adjacent to the left-hand thread crest. The curve 252R is easily obtained from the elevations of FIG. 17, since the angle $a$ of the face 252 (FIG. 16) is known. FIG. 18 shows a typical relationship between the crest of the left-hand thread 78 and the face of the right-hand thread 80. Between the zones 0 and 3, the crest 250 of the left-hand thread 78 clears the face 252 of the right-hand thread 80. At around zone 3, the left-hand thread crest 250 engages the right-hand thread face 252, and the curves of FIG. 18 show that the crest should be below the face. This condition cannot exist for the thread direction shown, inasmuch as the threads are formed from solid materials. Hence the crossing of the elevation curves 250L and 252R indicates that an interference fit between the crest and opposing face is taking place, and particularly that opposing faces 252 of the screws 78 and 80 are engaging each other. If the screws 78 and 80 are formed from a deformable resilient material such as plastic, this engagement can take place by deformation of the screw threads.

Figure 19:
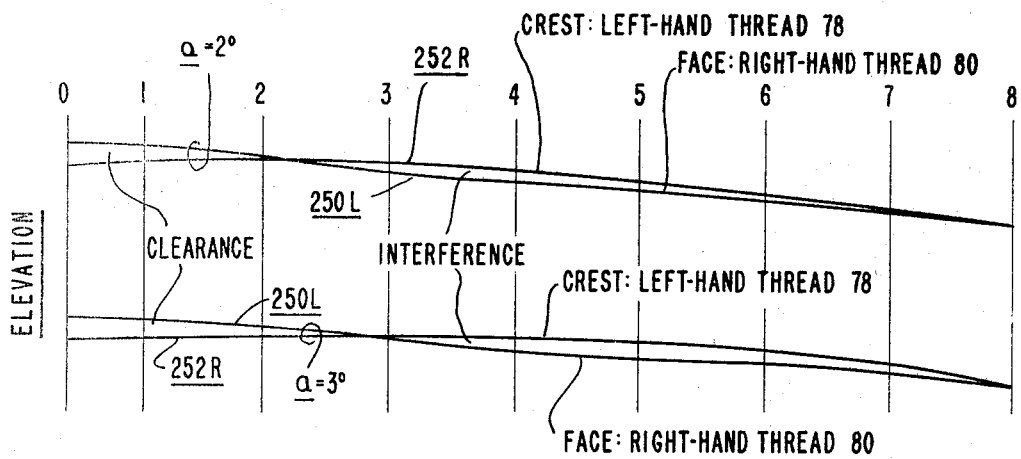
FIG. 19 shows elevational views similar to those of FIG. 18 for two different screw face angles.

FIG. 19 shows elevations similar to the elevations of FIG. 18 for two different angles $a$, illustrating the clearance and interference between the crest 250 of the left-hand thread 78 and the opposing face 252 of the right-hand thread 80 in the region of intermeshing of the screws. As will be noted from the upper set of curves for an angle of 2°; the clearance exists until just after zone 2; interference is from this point to zone 8. In the lower of the two figures for an angle of 3°, on the other hand, interference does not take place until just before zone 3. It has been found that a face angle of 3° is preferable using typical plastic materials to avoid undue stresses, while at the same time providing sufficient interference in the region of intermeshing of the screws to establish the discrete packets of fluid.

The selection of the angles $a$ and $b$ to provide the proper interference engagement in the zone 122 shown in FIG. 11 may be easily determined. Typically, the crest radius $R_c$ and the root radius $R_r$ (FIG. 16) are chosen. The difference $R_c-R_r$ determines the root depth, i.e., the depth of cut. A screw lead L is chosen which is typically equal to or slightly greater than the depth of cut, to ensure a fairly substantial volume for each packet of fluid. The helix angle $(\theta_c)$ of the crest and the helix angle $(\theta_r)$ of the root are calculated as follows:

$$\tan \theta_c = L/2\pi R_c \qquad (1)$$
$$\tan \theta_r = L/2\pi R_r \qquad (2)$$

It has been found that the angle $a$ of face 252 (FIG. 16) may be related to the crest and root angles $\theta_c$ and $\theta_r$ as follows:

$$a = 1.3(\theta_r - \theta_c) \qquad (3)$$

Such a relationship normally provides sufficient interference of the screws in the zone of intermeshing to ensure that packets of fluid are formed as the screws are rotated; complete interference throughout the entire zone 122 is typically not realized to avoid such undue stresses.

The remaining angle $b$ of the face 254 (FIG. 16) may be easily calculated since all the other factors that determine this angle are known. It may be shown that the angle $b$ is given as follows:

$$\tan b = \frac{R_c - R_r}{L - (R_c - R_r) \tan a}. \qquad (4)$$

The arrangement 34 shown in FIGS. 3–6, for the position of the valve 68 in FIGS. 7 and 9, tests samples of fluid, each of which is caused to flow past the inlet probe 50 through the pump 76, and past the outlet probe 52. Each sample of fluid spends a measured almount of time in the pump 76, depending upon the speed of rotation of the screws 78 and 80. If the pump speed is maintained constant, each sample then takes the same amount of time in passing from the inlet probe 50 to the outlet probe 52. During this time, the sample of fluid consumes dissolved oxygen, as represented by the curve shown in FIG. 1, which is not replenished since the enclosure 93 is sealed. Hence for each sample of fluid, the concentration of dissolved oxygen in the sample as detected by the inlet probe is different from the concentration as detected by the outlet probe. This difference represents the oxygen consumed, and inasmuch as the time period under which the determination is made is the same for all samples, the difference is representative of the rate of oxygen consumption.

When the flow controlling valve 68 is moved to the position shown in FIGS. 8 and 10, fluid is pumped by the pump 76 inwardly from the surrounding liquid environment through both the inlet 56 and the outlet 60 past the inlet probe and the outlet probe. In this instance, the probes are contacted by liquid having the same concentrations of dissolved oxygen, and hence signals developed by the probes may be compared to see if they are the same. If the signals are not the same, the probe circuits can be suitably adjusted to provide calibration.

Figure 12:
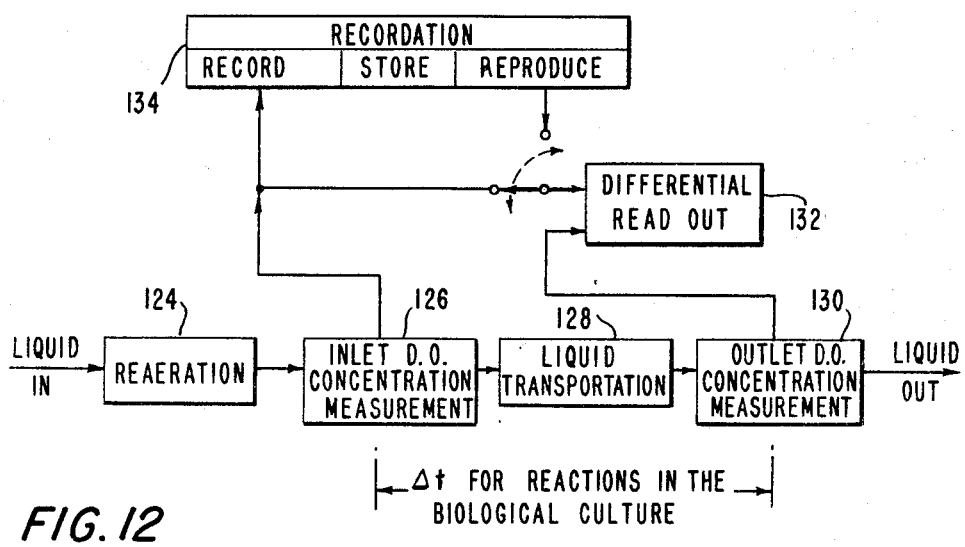
FIG. 12 is a flow diagram illustrating the determination of the rate of consumption of dissolved oxygen in accordance with the invention and utilizing a device such as that shown in FIG. 3.

After the probes 50 and 52 have been calibrated and it is desired to conduct a test to determine the oxygen uptake of the fluid in which the housing 34 is immersed, the valve control rod 96 is actuated to move the valves to the position shown in FIGS. 7 and 9 in which liquid flows into the inlet 56 past the inlet probe 50, and is pumped by the pump 76 past the outlet probe 52 and through the outlet 60. FIG. 12 is a flow diagram illustrating the steps carried out in the process to determine the uptake rate. In FIG. 12, the heavy lines represent the flow of liquid; the light lines represent computational steps.

Referring to FIG. 12, the liquid to be tested is first reaerated, as represented by the block designated 124 and as carried out in the system of FIG. 2 by the process taking place within the reaeration tube 26. The reaeration of the liquid ensures that the concentration of dissolved oxygen of the liquid during the entire test is represented by the linear portion of the curve in FIG. 1. The reaerated liquid then flows into the uptake rate device 22 past the inlet probe 50, which determines the dissolved oxygen concentration of the liquid at the inlet. This step is represented by the block designated 126 in FIG. 12.

The liquid is then pumped through the uptake rate device 22 by the positive displacement pump 76, as represented by the block designated 128 in FIG. 12. The pumped liquid spends a measured amount of time within the uptake rate device and then is caused to flow past the outlet probe 52, which determines the dissolved oxygen concentration of the liquid at the outlet. This oxygen concentration determination is represented by the block designated 130 in FIG. 12.

In FIG. 12, the transportation of a quantity of liquid within the uptake rate device between the inlet and the outlet involves a time $\Delta t$ during which the oxidation reactions take place to consume dissolved oxygen. The difference between the concentrations of dissolved oxygen of the liquid quantity at the inlet and the outlet of the uptake rate device represents the oxygen consumed during the transit time $\Delta t$. If the concentration of dissolved oxygen of liquid at the inlet is constant or is varying relatively slowly so that it may be assumed to be constant during the transit time $\Delta t$, then the inlet and outlet dissolved oxygen concentration measurements may be directly compared, notwithstanding the fact that the measurements are of different samples of liquid. In the flow diagram of FIG. 12, the inlet and outlet dissolved oxygen concentration measurements are shown as being directly compared to provide a differential readout of oxygen consumed, as represented by the block designated 132. The transit time $\Delta t$ of liquid through the device can be made constant by suitable regulation of the pumping speed, and hence the differential readout is truly representative of the rate of oxygen consumption of liquid continuously passing through the uptake rate device.

If the concentration of dissolved oxygen at the inlet changes appreciably during the transit time $\Delta t$, then the inlet and outlet dissolved oxygen concentration measurements cannot be compared directly, inasmuch as at any instant the measurements are of dissolved oxygen concentrations of different quantities of liquid. Hence the process provides for the recordation of the dissolved oxygen concentration measurement at the inlet, as represented by the block designated 134 in FIG. 12. The inlet measurement is continuously recorded and stored to be reproduced at a time $\Delta t$ later. The reproduced measurement is compared with the measurement of dissolved oxygen concentration at the outlet, as represented by the differential readout block 132 in FIG. 12. In this manner the dissolved oxygen concentration of any sample of liquid at the outlet is compared with the concentration of that same sample when it was present at the inlet, to provide a correct indication of the dissolved oxygen uptake rate of that sample.

FIG. 13 discloses a system for carrying out the process of FIG. 12. Signals from the inlet probe 50 are applied across terminals 142 and 144. A preselected conversion and D.C. return resistance 146 is connected across these terminals. A gain adjustment resistor 150 is included for varying the gain of the amplifier 148. Output conductor 152 from the amplifier 148 is coupled by a thermistor 154 back to the ungrounded input of the amplifier to provide suitable feedback.

With the circuit configuration shown in FIG. 13, and if the amplifier 148 is chosen to have a relatively high open loop gain, the signal at the output conductor 152 will be related to the signal at the input terminals 142 and 144 by a factor directly related to the impedance of the thermistor 154. The thermistor, whose impedance varies with temperature, thus causes the amplification to be dependent upon temperature. Since the input signal at terminals 142 and 144 from the inlet probe 50 varies with temperature, the circuit of FIG. 13 operates to compensate for such variations so that the amplified probe signal does not vary with temperature.

The output signal from the amplifier 148 is applied to a contact 155a and thence through a switch 156 to an output adjustment resistor 157 which adjusts the magnitude of the output signal. The signal from the output adjustment resistor 157 is applied to a differential output indicator 158.

Signals from the outlet probe 52 are similarly applied to terminals 160 and 162 in FIG. 13, across which a preselected conversion and D.C. return resistance 164 is connected. A gain adjustment resistor 166 connects the terminal 160 to one input of an amplifier 168, the other input to which is grounded. Output conductor 170 from the amplifier 168 is connected by a thermistor 172 back to the ungrounded input of the amplifier. The open loop gain of the amplifier 168 is chosen relatively high and is of the same order as the gain of the amplifier 148. Hence the output signal at the conductor 170 represents the outlet probe signal amplified and suitably compensated for temperature variations.

The output signal from the amplifier 168 is coupled through an output adjustment resistor 174 to the differential output indicator 158. This indicator provides an output indication representative of the difference between the output signals from the amplifiers 148 and 168 as modified by the output adjustment resistors 156 and 174. Hence the differential output indicator provides a continuous indication of the difference between the dissolved oxygen concentration of liquid at the inlet and at the outlet of the device shown in FIGS. 3–6, which is representative of the rate of oxygen uptake. The indicator may comprise a strip chart recorder, for example, to provide a continuous record of the uptake rate.

Figure 14:
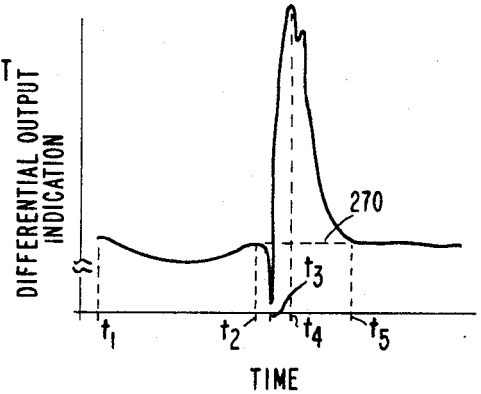
FIG. 14 is a curve showing the output signal versus time of a circuit such as that shown in FIG. 13.

FIG. 14 is a curve showing differential output indication, i.e., the difference between inlet and outlet dissolved oxygen concentrations, versus time for a typical fluid continuously passing through the uptake rate device. Initially, the curve is relatively constant during the period from time $t_1$ to $t_2$. This represents a typical aerobic biological culture undergoing a fixed rate of consumption of dissolved oxygen as required by auto-oxidation reactions. At the time $t_2$, the culture applied to the device is caused to suddenly change, for example, by the application of feed material to the liquid environment in which the uptake rate device is immersed. Between the time $t_2$ and $t_3$, the differential output indication decreases sharply. This is because the addition of the feed material to the culture causes the oxygen uptake to increase sharply so that the dissolved oxygen concentration of liquid in the inlet is substantially reduced. The liquid at the outlet of the device, however, is the liquid passing through the device before the feed material was added to the culture, whose oxygen uptake rate is that represented by the portion of the curve between $t_1$ and $t_2$. Hence initially the differential output indication drops simply because the liquid at the inlet is consuming oxygen much faster than the liquid at the outlet. This drop illustrates why the inlet and outlet probe signals should not be directly compared when the dissolved oxygen concentration of liquid at the inlet is changing.

Between the time $t_3$ and $t_4$, the culture with the new feed becomes present at the outlet, until finally at time $t_4$ the new material fills the entire device and is passing therethrough. The differential output indication curve takes the form of that shown in FIG. 14 between the times $t_4$ and $t_5$. During this time, the biological culture consumes oxygen at a decreasing rate as the feed material added to the culture is oxidized. Finally, the curve levels off after time $t_5$ again at a steady value depicting the substantial steady state rate of consumption of dissolved oxygen in the culture (auto-oxidation).

A curve such as that shown in FIG. 14 was developed utilizing a device as shown in FIGS. 3–6A and an electrical system as shown in FIG. 13. An acetic acid culture was employed in a system volume of approximately ten liters, into which the device of FIGS. 3–6A was immersed. At the time $t_2$ in FIG. 14, a feed of 200 mg. of acetic acid was added to the system. The change in the time elapsing between $t_2$ and $t_5$ in FIG. 14 was approximately sixteen minutes, and the differential output indication between the steady state curve value and the peak curve value shown in FIG. 14 was approximately 1.25 p.p.m. of dissolved oxygen or 50 p.p.m./hr. at the pumping rate of the device. The area under the curve between the times $t_4$ and $t_5$ to base line 270, which base line represents auto-oxidation in the mixture of culture and feed material during this time, was computed to be roughly 6.40 p.p.m. of oxygen. This area represents the total amount of oxygen consumed by the mixture of culture and feed of organic material to stabilize the organic material, i.e., to synthesize the organic material into cell material and other oxidation products. This total amount of oxygen is termed energy oxygen, and is an important fundamental measurement of any organic material. In particular, it is believed that energy oxygen is constant for any given organic material regardless of the rate of stabilization. Hence by rendering the concentration of microorganisms in a culture sufficiently high and by providing an abundant supply of oxygen at all times, the energy oxygen of a sample of organic material added to the culture may be determined in a relatively short time, as in roughly a quarter of an hour in the example given. This, then, provides a testing technique eminently suitable for monitoring a biological oxidation process undergoing stabilization of organic material over a long period, such as a few weeks. By removing a sample from the process, accelerating stabilization of the organic material in the sample, and determining the amount of oxygen used in stabilization through integration of the oxygen uptake rate during stabilization, the state of the process may be easily detected. This may be repeated any number of times to monitor the process.

The determination of energy oxygen as outlined above is being claimed in my copending application Ser. No. 427,296, filed Jan. 22, 1965, for Measuring Arrangement, which copending application is assigned to the assignee of the present application.

Figure 15:
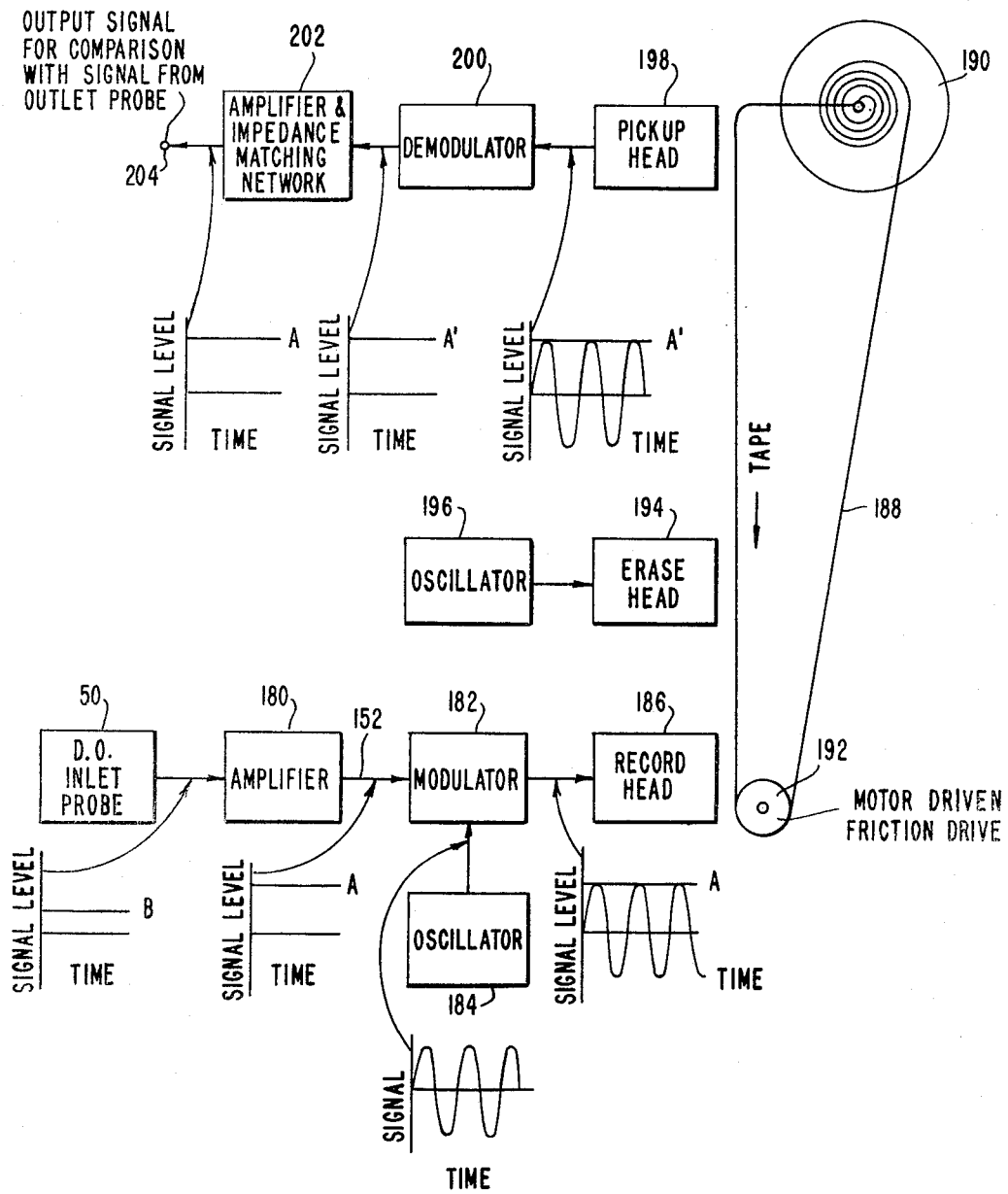
FIG. 15 is a block diagram of an electrical circuit in accordance with the invention useful with the circuit of FIG. 13 for carrying out an alternate part of the process as indicated by the flow diagram of FIG. 12.

FIG. 15 shows in block diagram form an electrical circuit in accordance with the invention which is useful with the circuit of FIG. 13 to provide a comparison of the inlet probe and outlet probe signals when the concentration of dissolved oxygen at the inlet is changing relatively substantially so that the inlet and outlet signals may not be properly compared directly. In the figure, the wave forms of all signals generated by the components employed are shown.

Referring to FIG. 15, the inlet probe 50 generates a signal that is applied to an amplifier 180, where temperature compensation is accomplished as previously described in connection with the circuit of FIG. 13. The signal from the amplifier appears on the conductor 152 which is the same as the conductor 152 in FIG. 13. The amplifier 180 in FIG. 15 thus constitutes the amplifier 148 in FIG. 13, with the temperature compensation provided by the thermistor 154. The signal from amplifier 180 is applied to a modulator 182 which receives a signal from an oscillator 184. The output signal from the modulator is a varying electrical signal whose peak amplitude corresponds proportionately to the amplitude of the signal from the amplifier 180. The signal from the modulator 182 is applied to a record head 186 with a selected bias voltage which continuously records the signal on an endless tape 188 which is shown moving away from and into an endless tape cartridge 190. The cartridge 190 may comprise any of the well known endless tape cartridges, a typical one of which is disclosed in Pat. No. 2,911,215 granted on Nov. 3, 1959 to B. A. Cousino for Tape Feeding Apparatus for Magnetic Sound Recording and Reproducing Mechanisms. In FIG. 15, the endless tape is driven by a friction drive 192.

Each portion of the tape 188 prior to passing by the record head 186 passes by an erase head 194 supplied with a signal from an oscillator 196. The information on the tape passing by the erase head is thus deleted, and new signals are recorded thereon by the record head 186.

The tape 188 enters into the cartridge 190 and emerges to pass by a pickup head 198. The output signal from the pickup head is applied to a demodulator 200, which is coupled to a combination amplifier and impedance matching device 202 which amplifies the signal from the demodulator to the original D.C. level of A corresponding to the output of amplifier 180. The signal from the amplifier and impedance matching device 202 appears at a terminal 204 which, as shown in FIG. 13, is connected to a terminal 155b adapted to be contacted by the switch 156.

Referring again to FIG. 15, the length of the endless tape 188 and the tape drive speed are chosen so that any signal recorded at a point on the tape by the record head 186 emerges from the cartridge 190 to pass by the pickup head 198 at a time $\Delta t$ later corresponding to the transit time of liquid through the housing 34, i.e., the time taken for liquid to pass from the inlet probe to the outlet probe. If the switch 156 in FIG. 13 is moved to make contact with the terminal 155b, signals from the output of the circuit of FIG. 15 are applied as one input to the differential output indicator 158. The other input to the indicator is the signal from the outlet probe 52 as amplified in the amplifier 168. Thus the differential output indicator 158 is provided with a first signal representative of the dissolved oxygen concentration of a sample of liquid at the outlet of the uptake device and a second signal representative of the oxygen concentration of the same sample when it was present at the inlet. The indicator 158 (FIG. 13) provides a continuous indication of the change in dissolved oxygen concentration, i.e., the rate of oxygen uptake, for liquid continuously passing through the device.

A test was made with the uptake rate device just described, which included recordation and delayed reproduction of the signal from the inlet probe 50. In particular, an uptake rate device such as shown in FIGS. 3–6A was immersed in a container of roughly four liters capacity which was filled with water. The water was continuously aerated by air introduced through a porous stone diffuser at the bottom of the container. The uptake rate device was connected to an electrical system such as shown in FIG. 13, which included a recording arrangement as shown in FIG. 15. At a given time roughly 300 mg. of sodium sulfite were added to the water in the container. The sodium sulfite rapidly consumed all the oxygen present within the water as well as the additional oxygen supplied to the water through the diffuser until all the sodium sulfite had become oxidized. Following the oxidation of the sodium sulfite, the water in the container became re-aerated. It should be noted that this test did not involve biological oxidation as did the test discussed above in connection with FIG. 14.

FIG. 20 is a plot, as a function of time, of the differential output signal, i.e., the delayed signal from the inlet probe 50 minus the signal from the outlet probe 52, as developed during the test. Before time $t_0$, the time at which the sodium sulfite was added to the container of water, the differential output signal was fairly constant, exhibiting fluctuations about a median. The fluctuations were due to noise generated by the recording system. At time $t_0$, the sodium sulfite was added to the system and the dissolved oxygen within the water was rapidly consumed. At time $t_1$, the differential output signal rapidly increased to a positive peak value at time $t_2$, followed by passage of the signal through zero at time $t_3$, peaking at a negative value a short time later at time $t_4$, and a gradual increase to zero at time $t_5$. The signal behavior between times $t_1$ and $t_5$ was due to blending of liquids taking place adjacent to each of the probes 50 and 52. That is, as may be noted from FIGS. 9 and 10, each of the probes 50 and 52 is surrounded by a substantial amount of liquid included within the associated one of the probe supporting tubes 46 and 48. As a result, liquid adjacent to each probe may include quantities of water taken at different times from the container in which the uptake rate device is immersed.

The effects of blending may be appreciated by considering FIG. 21, which shows the inlet probe signal, as recorded followed by delayed reproduction thereof, and the outlet probe signal. At time $t_1$, following the addition of the sodium sulfite to the water at time $t_0$, the outlet probe signal began to decrease, even though the liquid pumped through the device was still aerated liquid containing no sodium sulfite. This was because of the blending of liquid at the outlet probe. The inlet probe signal at this time, because of the recording and delayed reproduction thereof, remained constant until the time $t_2$, at which time it decreased steadily. It will be noted from FIG. 21 that the inlet probe signal decreased rather rapidly between the times $t_2$ and $t_4$ to the zero level, while the outlet probe signal decreased less rapidly to the zero level between the times $t_1$ and $t_5$. The two signals were equal at the time $t_3$. The difference between the rates of change of the signals was due to the different blending rates at the inlet and outlet probes. In particular, blending occurred at the inlet probe much more rapidly than at the outlet probe. If the difference between the two curves in FIG. 21 is plotted as a function of time between the times $t_1$ and $t_5$, the curve of FIG. 20 between these times results.

Referring again to FIG. 20, the period between times $t_5$ and $t_6$ represents a "dead time" in which no dissolved oxygen was present in the system and the differential output signal was roughly zero. No fluctuations of the output signal due to noise were experienced since the signal was at ground level. During this dead time, all oxygen supplied to the system through the porous stone diffuser was consumed by the sodium sulfite within the system until finally at time $t_6$ all the sodium sulfite was oxidized.

Between times $t_6$ and $t_7$, the system in which the uptake rate device was immersed became aerated. That is, since all the sodium sulfite was oxidized, oxygen became present in the water and the concentration of dissolved oxygen increased until time $t_7$, at which time the water was saturated with oxygen. It will be noted that the differential output signal dropped after the time $t_6$ and then rose to the zero level. This signal behavior was occasioned by liquid blending adjacent to the inlet and outlet probes as described above. In particular, the initial increase of dissolved oxygen concentration after time $t_6$ caused the outlet probe signal to increase, because of blending, which caused the differential signal to become negative. The differential signal then increased slowly to the zero level, and was not accompanied by positive peaking, since the change in dissolved oxygen concentration was at first rapid, then slow. In other words, the probe signals did not cross as at time $t_3$ in FIG. 21, but the outlet probe signal was at all times more positive than the delayed inlet probe signal until the two signals approached the same level of dissolved oxygen concentration at time $t_7$ at the end of the re-aeration period. It will be noted that during this period the differential signal fluctuated due to noise in the recording system.

The same type of test was followed utilizing the uptake rate device without the recording and delayed reproduction of the inlet probe signal to show the advantages of such recording and delayed reproduction. Again the uptake rate device was submerged in a container of roughly four liters capacity and filled with water. The water was continuously aerated by air introduced through a porous stone diffuser at the bottom of the container. The uptake rate device was connected to an electrical system such as shown in FIG. 13, but not including the recording arrangement of FIG. 15. At a given time roughly 300 mg. of sodium sulfite were added to the water. FIG. 22 plots, as a function of time, the differential signal from the uptake rate device, i.e., the inlet probe signal minus the outlet probe signal. Before time $t_0$, the time at which the sodium sulfite was added to the water, the differential output signal was constant at the zero level. At time $t_1$ following time $t_0$, the differential output signal dropped rapidly to an extreme negative value because of the lack of any oxygen in the water at the inlet probe, while water at the outlet probe from within the device still had dissolved oxygen therein. The differential output signal increased fairly rapidly until time $t_2$ as liquid with no oxygen therein became present at the outlet probe after being pumped through the device. The differential output signal then increased relatively slowly during the times $t_2$ and $t_3$. During this period, the concentration of dissolved oxygen in the water within the container was near zero, but some oxygen was present at the inlet probe. This period represents the dead time during which roughly all oxygen supplied to the system through the porous stone diffuser was consumed to oxidize the sodium sulfite.

At the time $t_3$, all the sodium sulfite in the system had been oxidized, so that between the times $t_3$ and $t_5$ the system became re-aerated. At time $t_5$, the system was saturated with oxygen. During this time period, and particularly between the times $t_3$ and $t_4$, the differential output signal increased rapidly due to the increased oxygen present in the water at the inlet probe with respect to the outlet probe. At time $t_4$, all the water in the uptake rate device virtually devoid of oxygen had been discharged (i.e., water drawn into the inlet between times $t_2$ and $t_3$). Between the times $t_4$ and $t_5$, the differential output signal slowly decreased as the concentration of dissolved oxygen in the water increased, until the time $t_5$ when aeration was complete.

A comparison of FIGS. 20 and 22 shows the advantages that may be gained with recording and delayed reproduction of the signal from the inlet probe for comparison with the outlet probe signal. In this comparison, it should be noted that although the concentration of oxygen was changing during various periods within the system into which the uptake rate device was immersed in each test, ideally during many of the periods any sample removed from the system should have exhibited no change in dissolved oxygen concentration since no oxidation consumption as in biological oxidation processes was occurring. This is particularly true, for example, in the reaeration periods of the tests following the oxidation of all the sodium sulfite. Hence the curve of FIG. 22 ideally would be constant at the zero level except for those brief periods when oxygen within the liquid in the uptake rate device was consumed due to the presence of unoxidized sodium sulfate in the liquid. Although in FIG. 20 there are some deviations from the zero level, i.e., between the times $t_1$ and $t_5$, as well as following $t_6$, due to liquid blending at the inlet and outlets probes, the areas under these curves to the zero level are relatively small, especially when compared with the areas under the curve in FIG. 22 during the periods $t_1$–$t_2$ and $t_3$–$t_5$. The curve of FIG. 22, however, even ideally cannot be constant at the zero level, since the inlet and outlet probe signals that are compared are derived from different samples of liquid from an environment in which dissolved oxygen concentration is changing. Hence the curve developed by a direct comparison of inlet and outlet probe signals must assume the shape of the curve in FIG. 22, leading to substantial areas under the curve during the periods $t_1$–$t_2$ and $t_3$–$t_5$. Recording the inlet probe signal and reproducing it with a delay equal to the transit time of liquid through the uptake rate device ensures that the inlet and outlet probe signals compared are derived from the same sample of liquid. This ensures that changes in the dissolved oxygen concentration in the environment have no effect on the test, and that only changes in dissolved oxygen concentration of samples removed from the environment and taking place within the uptake rate device are detected.

As described above, the deviations of the curve in FIG. 20 from the zero level were due to blending of liquid adjacent to the inlet and outlet probes. To cut down on such blending, the device of FIGS. 3–6A may be modified in the regions of these probes, as shown in FIG. 23. FIG. 23 is similar to FIG. 5, and shows the inlet and outlet probes 50 and 52 and their respective stirrers 57a and 57b. The inlet probe arrangement may be taken as representative, and includes blocks 272a and 274a secured to stirrer shaft 59a on opposite sides of the stirrer 57a. The blocks fill the major portion of the chamber adjacent to the inlet probe so that the volume of liquid presented to the probe is substantially reduced from the volume of liquid presented to the probe in the structure shown in FIG. 5. By reducing the volume of liquid adjacent to the probe, blending of liquid next to the probe is greatly reduced.

As the stirrer shaft 59a makes one revolution, the blocks 272a and 274a alternately close off the inlet 56 except for two periods during each of which an end of the stirrer 57a is adjacent to the inlet. As shown in the figure, the block 274a is closing off the inlet 56 to the inlet probe 50, while the outlet probe 52 is opened to the outlet 60 inasmuch as an end of the stirrer 57b is adjacent to the outlet. The alternate closing and opening of both the inlet 56 and the outlet 60 reduces the times that the inlet and outlet probes communicate with the outside environment.

As shown in FIG. 23, the lower ends of the inlet and outlet probes are respectively engaged by annular rings 276a and 276b, advantageously formed from soft polyurethane foam, for example, which seal the probes and present only the ends thereof to the respective stirrers. The rings therefore aid in reducing the volumes of liquid presented to the probes to reduce the effects of liquid blending.

It will be noted that a unique system has been provided for determining the oxygen uptake rate of a biological culture. The invention includes a device that enables discrete samples of culture to be tested on a testing basis such that a liquid environment may be continuously monitored.

It will be appreciated that the embodiments shown are susceptible of modifications which nonetheless come within the spirit of the invention. Accordingly, the invention is to be determined by the following claims.

What is claimed is:

1. In apparatus for determining the rate of consumption of a dissolved gas in a liquid, the combination of means defining a fluid path along which the liquid is conveyed, and first and second detecting means positioned in the path at spaced positions each for generating a signal representative of the concentration of said dissolved gas in the liquid, means for storing the signal generated by one of the detecting means, and means responsive to the difference between the stored signal and the signal from the other of the detecting means.

2. In apparatus for determining the rate of consumption of a dissolved gas in a liquid, the combination of means defining a housing having an inlet and an outlet for receiving and discharging respectively the liquid, first and second detecting means positioned in the housing adjacent the inlet and outlet respectively each for detecting the concentration of said dissolved gas in the liquid, means positioned within the housing and defining a fluid path of predetermined length for coupling the inlet and the outlet of the housing, including means defining a second outlet from the housing, and pumping means including valve means for pumping liquid into the housing through both the inlet and the outlet of the housing past the detecting means to the second outlet of the housing through which it is discharged.

3. In apparatus for determining the rate of consumption of a dissolved gas in a liquid, the combination of means defining a housing having an inlet and an outlet for receiving and discharging respectively the liquid, first and second detecting means positioned in the housing adjacent the inlet and outlet respectively each for providing an indication of the concentration of said dissolved gas in the liquid, and means positioned within the housing and defining a fluid path of predetermined length for coupling the inlet and the outlet of the housing and including pumping means for pumping discrete quantities of the liquid through the housing.

4. In apparatus for determining the rate of consumption of a dissolved gas in a liquid, the combination of means defining a housing having an inlet and an outlet for receiving and discharging respectively the liquid, first and second detecting means positioned in the housing adjacent the inlet and outlet respectively each for generating a signal representative of the concentration of said dissolved gas in the liquid, and means positioned within the housing and defining a fluid path of predetermined length for coupling the inlet and the outlet of the housing, means for continuously storing the signal from one of the detecting means, means for reproducing the stored signal at a time $\Delta t$ later corresponding to the transit time of liquid through the housing, and means responsive to the difference between the reproduced signal and the signal from the other of the detecting means.

5. In a method of determining the rate of consumption of a dissolved gas in a liquid, the steps comprising detecting at a first position the concentration of said dissolved gas in the liquid, conveying discrete quantities of liquid continuously from the first position to a second position while permitting no further gas to become dissolved in the liquid, and detecting at the second position the concentration of said dissolved gas in the liquid.

6. A method as recited in claim 5, wherein the discrete quantities of liquid are conveyed from the first position to the second position at a predetermined rate.

7. In a method of determining the rate of consumption of dissolved oxygen in a liquid, the steps comprising detecting at a first position the concentration of dissolved oxygen in the liquid, conveying the liquid to a second position at a predetermined rate of transfer while permitting no further oxygen to become dissolved in the liquid, and detecting at the second position the concentration of dissolved oxygen in the liquid.

8. A method as recited in claim 7, wherein the liquid is conveyed in discrete quantities from the first position to the second position.

9. In apparatus for determining the rate of consumption of a dissolved gas in a liquid, the combination of means defining a housing having an inlet and an outlet for receiving and discharging respectively the liquid, first and second detecting means positioned in the housing adjacent the inlet and outlet respectively each for detecting the concentration of said dissolved gas in the liquid, and pumping means positioned within the housing for pumping fluid from the inlet to the outlet, said pumping means comprising first and second screws of deformable resilient material each having a helical thread which includes first and second faces joined at a helical crest, said screws being positioned so that the threads intermesh with each other, one of the faces of one screw thread engaging in an interference fit an opposing face of the other screw thread in at least a substantial portion of the region of intermeshing of the screw threads, an enclosure surrounding the first and second screws and formed with a surface engaging the crests of the threads of the first and second screws outside the region of intermeshing of the screws, a pump inlet and a pump outlet positioned at the ends of the screws adjacent the first and second detecting means respectively to receive and discharge fluid, and means for rotating the first and second screws to pump fluid from the inlet of the housing past the first detecting means to the outlet of the housing past the second detecting means.

10. In a method of determining the rate of consumption of dissolved oxygen in an aqueous medium subject to biological oxidation processes, the steps comprising detecting the concentration of dissolved oxygen in each of a plurality of samples of said medium at a first position, the samples being taken at successive times, conveying the samples separately and successively from the first position to a second position at a predetermined rate of transfer while permitting the biological oxidation processes in each sample to proceed alone without permitting access of additional oxygen to the sample, and detecting the concentration of dissolved oxygen in each of the samples at said second position at a time at which oxygen consumption has proceeded to a substantial extent but has not approached complete consumption of oxygen in the sample.

11. In a method of determining the rate of consumption of dissolved oxygen in an aqueous medium subject to biological oxidation processes, the steps comprising detecting the concentration of dissolved oxygen in a sample of said medium at a first time at a first position, permitting the biological oxidation processes to proceed alone without permitting access of additional oxygen to the sample while transferring the sample to a second position, and detecting the concentration of dissolved oxygen in the sample at a determined later time at said second position at which oxygen consumption has proceeded to a substantial extent but has not approached complete consumption of oxygen in the sample.

12. A method as recited in claim 11, wherein the sample is transferred at a predetermined rate from said first position to said second position.

References Cited

UNITED STATES PATENTS

| | | | |
|---|---|---|---|
| 3,367,849 | 2/1968 | Blaedel et al. | 204—1.1 |
| 1,668,434 | 5/1928 | Todd | 204—195 |
| 2,901,327 | 8/1959 | Thayer et al. | 324—30 |
| 2,908,226 | 10/1959 | Rich et al. | 103—128 |
| 2,913,386 | 11/1959 | Clark | 204—195 |
| 2,994,562 | 8/1961 | Zalis | 103—128 |
| 3,045,665 | 7/1962 | Moyat | 204—129 |
| 3,208,926 | 9/1965 | Eckfeldt | 204—1.1 |
| 3,232,851 | 2/1966 | Haber et al. | 204—1.1 |
| 3,308,041 | 3/1967 | Strickler | 204—195.1 |

OTHER REFERENCES

Meaney et al., "The Application of the Galvanic Cell Oxygen Analyzer to Waste Control Programs," presented at 17th Industrial Waste Conference, Purdue University, May 1–3, 1962, pp. 1–4 & 20–25.

TA-HSUNG TUNG, Primary Examiner

U.S. Cl. X.R.

103—128; 204—195; 324—29